T. T. CHALONER.
VEHICLE WHEEL.
APPLICATION FILED JAN. 20, 1912.
1,046,969.
Patented Dec. 10, 1912.
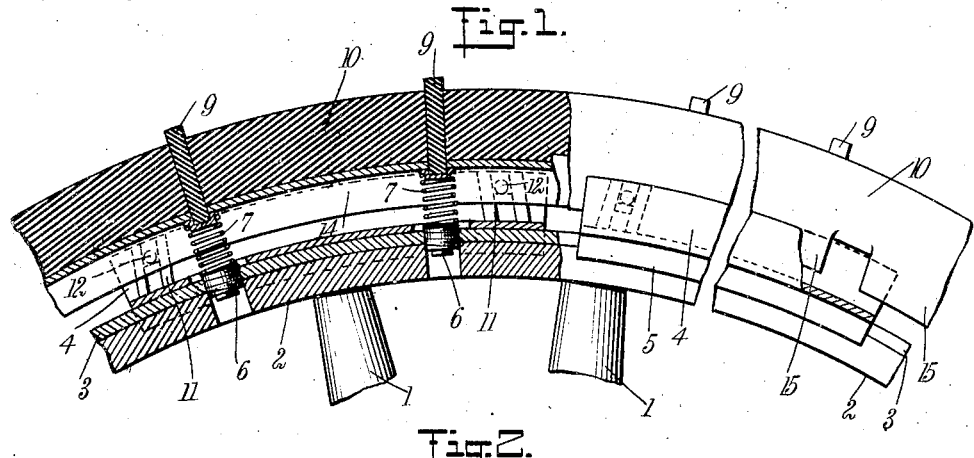
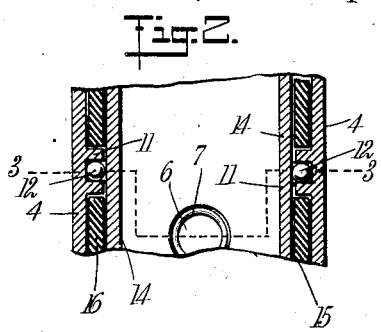
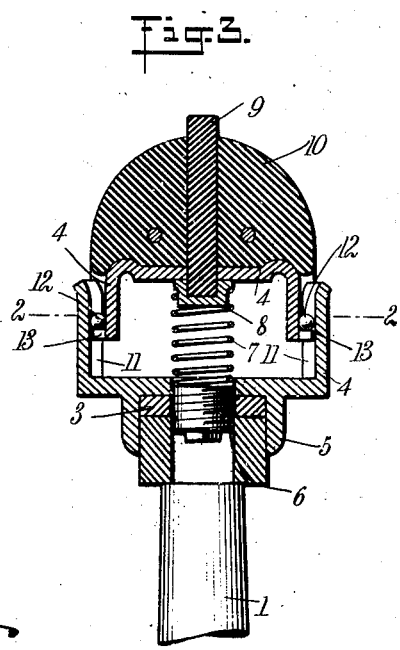
WITNESSES
INVENTOR
Thomas T. Chaloner
BY
ATTORNEYS

UNITED STATES PATENT OFFICE.

THOMAS T. CHALONER, OF NEW YORK, N. Y.

VEHICLE-WHEEL.

1,046,969.  Specification of Letters Patent.  Patented Dec. 10, 1912.

Application filed January 20, 1912. Serial No. 672,369.

*To all whom it may concern:*

Be it known that I, THOMAS T. CHALONER, a citizen of the United States, and a resident of the city of New York, borough of Manhattan, in the county and State of New York, have invented a new and Improved Vehicle-Wheel, of which the following is a full, clear, and exact description.

The invention relates more particularly to a resilient wheel and has as an object the provision of improved means for resiliently supporting an outer rim or tread member.

Another object of the invention is the provision of an improved wheel structure formed with an outer rim supported by springs and a plurality of resilient plugs projecting beyond the rim.

In carrying out the objects of the invention, a hub and spokes of any desired kind may be used, together with a felly and rim of any preferred structure. Mounted on the rim is a tire or movable rim held away from the felly by a plurality of springs. The springs are supported and held in place by suitable plugs threaded into the felly and extending into the fixed rim on the felly so that when in operation the removable rim will resiliently move as occasion may require, the same being guided by suitable guideways which prevent independent rotation of the removable rim but permit a free radial motion thereof. Associated with the movable rim is a plurality of plugs extending therethrough and through a rubber tire mounted thereon. These plugs are formed preferably of rubber so as to act as anti-skidding devices as well as resilient supports.

A practical embodiment of the invention is represented in the accompanying drawings forming a part of this specification, in which similar characters of reference indicate corresponding parts in all the views.

Figure 1 is a fragmentary side view of a wheel showing an embodiment of the invention, certain parts being broken away to better illustrate the construction; Fig. 2 is a section through Fig. 3 on the line 2—2 of Fig. 3; and Fig. 3 is a section through Fig. 2 approximately on the line 3—3.

Referring to the accompanying drawings by numerals, 1 indicates spokes of any desired kind, to which is secured a felly 2 and a fixed rim 3. The fixed rim 3 and the felly 2 are made of metal or any other material. Mounted on the rim 3 and felly 2, are a plurality of channel-shaped members 4 having channel-shaped projections 5 formed thereon for fitting over the stationary rim 3 and felly 2. The sections 4 are held against any considerable independent longitudinal movement by plugs 6, which also hold a spring 7 properly in place against a retaining cap-shaped washer 8. The washer 8 is designed to hold the plug 9 correctly in a tire 10, the plug 9 and tire 10 being preferably formed of rubber of some good quality. On the sections 4 there are arranged one or more channels 11 which accommodate antifriction members 12, and also projections or pins 13 extending from an annular movable rim 14 formed preferably substantially channel-shaped in cross section, as shown in Fig. 3. These channels are preferably arranged parallel with the center line of the respective spokes 1, with sufficient play for allowing a proper radial movement of the rim 14 without causing any binding. It will be evident that as the radial movement of the rim 14 is comparatively small, each movement will be unappreciable.

In use, the plugs 9 will act as a protection for the tire 10, and also as anti-skidding devices. In case a heavy pressure should bear against any of the plugs 9, the same will simply move inward and compress the spring 7 to a greater extent and will then move outward again when the pressure has been removed. In case any of the springs 7 should break, or it is desired to remove any of the plugs 9, the screw plug 6 may be removed, which will permit ready access to the spring 7, washer 8, and also will permit the removal of the plug 9. It will be noted that each of the springs 7 is provided with a plug 9 and also the screw plug 6, so that any of the springs or plugs may be repaired or renewed without taking the entire wheel to pieces or affecting any of the remaining parts of the wheel.

The anti-friction balls 12 are designed to make the movable rim 14 move easier, and to do away with squeaking and other noises to a large extent. However, to positively prevent any squeaking, the tire 10 is formed with depending portions 15 and 16 which extend downward between the flanges of the rim 14 and the flanges of the sections 4, as more clearly shown in Fig. 2, whereby the telescoping members may rub against a yielding surface until the same has been worn to a considerable extent.

Having thus described my invention I claim as new and desire to secure by Letters Patent:—

1. The combination with a vehicle wheel, of a plurality of independent sections formed with ways therein, a movable rim formed with pins projecting into said ways, anti-friction members supported by said pins and arranged to prevent the pins from engaging the sides of said sections, and a plurality of springs for resiliently supporting said movable rim.

2. The combination with a vehicle wheel, of a movable rim, a plurality of springs engaging the under surface of said rim for yieldingly holding the same in a predetermined position, an adjustable supporting member for each of said springs, a tire mounted on said rim, and a plug on each of said springs extending through said tire and said rim and engaging said springs for being independently supported thereby.

3. The combination with a vehicle wheel, of a movable rim, a plurality of loosely arranged plates engaging the under surface of the rim, a plurality of springs engaging the under surface of said plates for yieldingly pressing the same against said rim and yieldingly holding the rim in a predetermined position, a tire mounted on said rim, and a plug for each of said plates extending through said tire and said rim, and resting on said plates for being independently supported by said plates and said springs.

4. The combination with a vehicle wheel, of a plurality of substantially channel-shaped sections formed with guiding ways, a movable rim formed with projections extending into said ways whereby the movable rim is guided in its movement, a plurality of springs engaging the under surface of said rim for yieldingly holding the same in a predetermined position, an adjustable supporting member for each of said springs, a tire mounted on said rim, and a plug for each of said springs extending through said tire and said rim and engaging said springs for being supported thereby.

In testimony whereof I have signed my name to this specification in the presence of two subscribing witnesses.

THOMAS T. CHALONER.

Witnesses:
GEORGE HENRY CHIPCHASE,
WILLIAM SAMUEL COOKE.